United States Patent
Gopalakrishnan et al.

(10) Patent No.: US 7,006,464 B1
(45) Date of Patent: Feb. 28, 2006

(54) DOWNLINK AND UPLINK CHANNEL STRUCTURES FOR DOWNLINK SHARED CHANNEL SYSTEM

(75) Inventors: Nandu Gopalakrishnan, Chatham, NJ (US); Teck H. Hu, Budd Lake, NJ (US); Farooq Ullah Khan, Manalapan, NJ (US); Achilles George Kogiantis, Madison, NJ (US); Pantelis Monogioudis, Randolph, NJ (US); Ashwin Sampath, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 769 days.

(21) Appl. No.: 09/716,105

(22) Filed: Nov. 17, 2000

(51) Int. Cl.
*H04Q 7/00* (2006.01)

(52) U.S. Cl. .................................. 370/328; 370/470

(58) Field of Classification Search ............... 370/328, 370/311, 329, 331, 335, 336, 337, 338, 339, 370/340, 341, 342, 345, 347, 441, 442, 470, 370/318, 320; 455/522
See application file for complete search history.

(56) References Cited

U.S. PATENT DOCUMENTS

| | | | | |
|---|---|---|---|---|
| 6,009,091 | A | 12/1999 | Stewart | 370/342 |
| 6,032,047 | A * | 2/2000 | Cerwall et al. | 455/450 |
| 6,400,755 | B1 * | 6/2002 | Harris et al. | 375/146 |
| 6,490,461 | B1 * | 12/2002 | Muller | 455/522 |
| 6,643,275 | B1 * | 11/2003 | Gustafsson et al. | 370/328 |
| 6,650,905 | B1 * | 11/2003 | Toskala et al. | 455/522 |
| 6,665,288 | B1 * | 12/2003 | Ottosson et al. | 370/342 |
| 6,678,257 | B1 * | 1/2004 | Vijayan et al. | 370/320 |
| 6,721,299 | B1 * | 4/2004 | Song | 370/342 |
| 6,760,311 | B1 * | 7/2004 | Raith | 370/252 |
| 2003/0099209 | A1 * | 5/2003 | Laakso et al. | 370/311 |

FOREIGN PATENT DOCUMENTS

| | | |
|---|---|---|
| EP | 0 954118 A3 | 11/1999 |
| EP | 0 993 128 A1 | 4/2000 |

OTHER PUBLICATIONS

Lucent Technologies: "(TSGR1#17(00)1384" TSG-RAN Working Group 1, Online! Nov. 21-24, 2000, XP002175651, Stockholm, Sweden Retrieved from the Internet: URL: http://www.3gpp.org/ftp/tsg_ran/WG1_RL1/TSGR1-17/Docs/PDFs/R1-00-1384.pdf retrieved on Aug. 23, 2001! * The whole document *.

European Search Report dated Sep. 14, 2001.

* cited by examiner

*Primary Examiner*—Brian Nguyen

(57) ABSTRACT

An uplink and downlink channel structure supports a shared downlink data channel. The new structure accommodates advanced physical and Medium Access Control (MAC) layer techniques, such as incremental redundancy (IR), fast adaptation to channel conditions, and multiple input multiple output (MIMO) antenna configuration. The proposed changes are intended to lead to a downlink structure that achieves higher spectral efficiency for the packet oriented services over then shared downlink channel. Additionally, the new structure uses the base station transmit power information and of the channelization (OVSF) code space more efficiently.

2 Claims, 2 Drawing Sheets

DOWNLINK AND UPLINK CHANNEL STRUCTURES FOR DOWNLINK SHARED CHANNEL SYSTEM

BACKGROUND OF THE INVENTION

1. Field of the Invention

This invention relates to wireless communications and, more particularly, to downlink and uplink channel structures to support a downlink shared channel system.

2. Description of Related Art

Wireless communications systems include conventional cellular communication systems which comprise a number of cell sites or base stations, geographically distributed to support transmission and receipt of communication signals to and from wireless units which may actually be stationary or fixed. Each cell site handles voice communications over a particular region called a cell, and the overall coverage area for the cellular communication system is defined by the union of cells for all of the cell sites, where the coverage areas for nearby cell sites overlap to some degree to ensure (if possible) contiguous communications coverage within the outer boundaries of the system's coverage area.

When active, a wireless unit receives signals from at least one base station or cell site over a forward link or downlink and transmits signals to (at least) one cell site or base station over a reverse link or uplink. There are many different schemes for defining wireless links or channels for a cellular communication system, including TDMA (time-division multiple access), FDMA (frequency-division multiple access), and CDMA (code-division multiple access) schemes. In CDMA communications, different wireless channels are distinguished by different codes or sequences that are used to encode different information streams, which may then be modulated at one or more different carrier frequencies for simultaneous transmission. A receiver can recover a particular information stream from a received signal using the appropriate code or sequence to decode the received signal.

Due to the delay-intolerant nature of voice communication, wireless units in conventional cellular systems transmit and receive over dedicated links between a wireless unit and a base station. Generally, each active wireless unit requires the assignment of a dedicated link on the forward link and a dedicated link on the reverse link. Traditional data applications are typically bursty and, unlike voice communications, relatively delay tolerant. As such, using dedicated links to transmit data is an inefficient use of network resources. Wireless communications systems are evolving that will support a variety of data services, such as wireless web browsing.

In the Universal Mobile Telecommunications System (UMTS), wireless units communicate with a base station over dedicated channels. To provide efficient wireless data communications, UMTS uses a downlink shared channel which can be shared by a plurality of wireless units to receive data. To improve system throughput, the system provides the wireless unit with the best reported rate access to the shared channel.

SUMMARY OF THE INVENTION

The present invention is an uplink and downlink structure to support a shared downlink data channel. The new structure accommodates physical and Medium Access Control (MAC) layer techniques, such as incremental redundancy (IR), fast adaptation to channel conditions, and multiple input multiple output (MIMO) antenna configuration. The proposed changes are intended to lead to a downlink structure that achieves higher spectral efficiency for the packet oriented services over the shared downlink channel. Additionally, the new structure uses the base station transmit power information and the channelization (OVSF) code space more efficiently.

BRIEF DESCRIPTION OF THE DRAWINGS

Other aspects and advantages of the present invention may become apparent upon reading the following detailed description and upon reference to the drawings in which.

DETAILED DESCRIPTION

Figure 1:
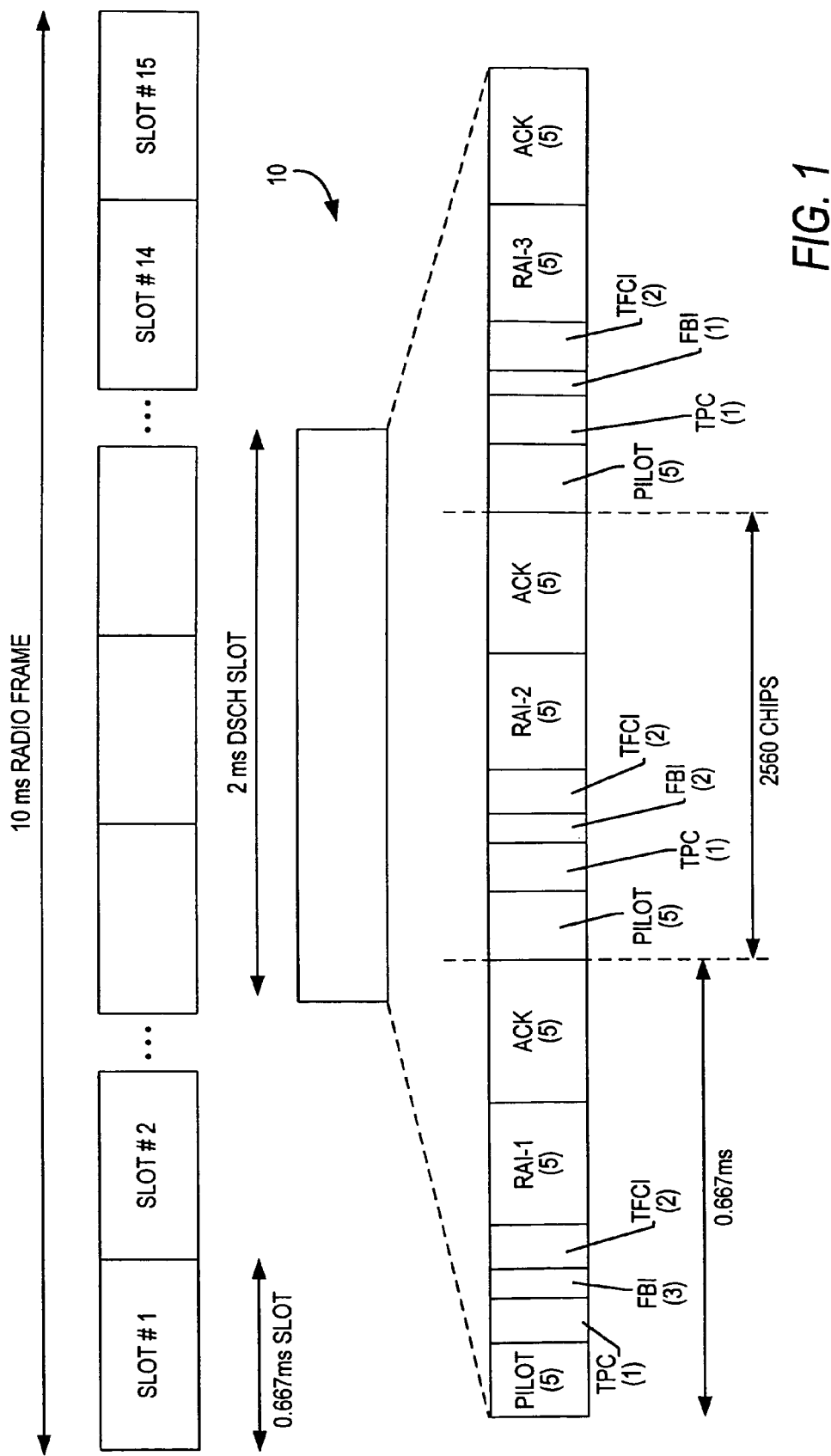
FIG. 1 shows a general diagram of an embodiment of the uplink dedicated physical control channel (UL DPCCH) frame structure according to principles of the present invention.

Illustrative embodiments of the downlink and uplink channel structures are described with respect to a UMTS system where the downlink shared channel is formed using at least one and more likely a plurality of channelization codes. The downlink shared channel is time-division multiplexed, being divided into 10 millisecond frames of 15 slots of 0.667 milliseconds. Wireless units provide rate and antenna feedback from which the base station decides whether to provide the wireless unit to the shared data channel.

Key aspects supported by the uplink and downlink channel structures are outlined here and a more detailed embodiment is provided below.

1. Explicit Rate and Antenna Information from the Wireless Unit:

Explicit Rate feedback from the wireless unit is preferred over sending Signal to Interference Ratio (SIR) measurements to the base station for the following reasons:

- The wireless unit is aware of the circuit switched or dedicated channel loading (by reading the available power fraction on the BEACCH described below) on all active code channels and uses this information in deciding the rate as well as the best serving cell during fast cell selection described below.

- The wireless unit is aware of the power fraction (the fraction of the power that is currently occupied by all other downlink dedicated physical channels) as well as current and future (RAI round-trip delay) data activity of all active connections or code channels with which the wireless unit is in soft handoff (simultaneously receiving from different base stations) as well as the path losses from each of these active soft handoff connections and uses this information in estimating the total expected interference better. This permits a more accurate determination of the rate that is important for the performance and fair scheduling of cell edge wireless units that are dominated by interferers.

There are multiple antenna configurations supported by embodiments of the channel structure. In certain embodiments, the RAI field in the UL DPCCH contains rate as well as information which can select the appropriate antenna or antenna configuration. Depending on the rate information (RI), the transmission/reception can be achieved via either multiple input/single output or multiple input/multiple antenna configurations.

2. Preamble Based User Identification on the Downlink Shared Channel:

The downlink shared channel is associated with a Downlink Dedicated Channel (DCH). This dedicated channel is used to identify the user that is scheduled for transmission in the shared channel. A preamble or a local or temporary identifier is a more efficient scheme to identify a user compared to a unique user identification. Larger spreading factor (SF) channelization codes can then be used, hence saving the downlink channelization code space.

3. Asymmetric Downlink and Uplink Transmission Time Interval:

From a frame-fill efficiency perspective, it is preferable to have one slot (0.667 ms) as the granularity for the downlink shared channel frame. This is because at data rates in excess of 10 Mbps and with typical Internet packet sizes, frame sizes greater than one slot could lead to considerable inefficiency. However, the link quality (or rate information) feedback from the wireless unit does not have to be at the rate of once per slot. The typical rate at which channel quality changes is slower than that of one slot. Besides, the overhead associated with per slot feedback of the link quality (or rate) would be excessive. Therefore, in certain embodiments, the uplink transmission time interval (TTI) is based on 3 slots or 2 ms.

4. Fast Cell-site Selection (FCS):

To support fast cell site selection, the wireless unit selects the best cell for its downlink transmission every TTI. Selecting the best cell based purely on signal strength measurement at the wireless unit unaware of the loading in the surrounding cells can result in selecting a cell that is heavily loaded. In later section a Downlink Broadcast channel is defined, among other functions, to support the wireless unit fast cell site selection. In this Downlink Broadcast channel, both the base station transmitter power fraction and an indication of the orthogonal variable spreading factor (OVSF) or channelization code space are sent. In addition, an OVSF code cover based approach for signalling the preferred cell site is proposed. The advantage with an OVSF code cover based approach over a coded bit field based approach is that it is much faster to detect. Thus, fields defined in the uplink dedicated physical control channel for cell ID can be avoided.

FIG. 1 shows an embodiment of the uplink (UL) dedicated physical control channel (DPCCH) frame structure 10 that supports a downlink shared channel. As discussed above, from a frame-fill efficiency perspective, it is best to retain a single- slot (0.667 ms) granularity for the downlink shared channel physical frame. However, for the uplink, the constraint may be relaxed. Here, a goal is to keep the feedback rate (bps) required to support the downlink shared channel adequately low. The higher the feedback rate, the greater the noise rise and consequently, the greater the reduction in uplink capacity for dedicated channels. Of a 10 ms radio frame divided into 15 slots of 0.67 ms each, a three-slot (2 ms) granularity for feedback of measured downlink quality information achieves a good trade-off between link quality tracking and feedback overhead.

The DPCCH spreading factor is lowered from 256 to 128. This allows for 20 coded bits per slot, and downlink shared channel-related control information is readily accommodated via the uplink dedicated physical control channel (UL DPCCH)-related control information. As before, each slot has 2560 chips. Two new fields are defined: Rate and Antenna Information field (RAI) and an acknowledgement (ACK)/negative acknowledgement (NACK) field. Other fields that already exist in current known versions of uplink DPCCH are retained: Pilot, TFCI, FBI and TPC. Pilot bits (5 per slot) will be used for coherent demodulation, TFCI bits (2 per slot) indicate the transport frame configuration or format of the associated uplink (UL) dedicated physical data channel (DPDCH) (if any), the FBI bits (2 per slot) indicate antenna weights and/or the site chosen for the downlink dedicated physical data channel (DPDCH) (if any), not the DSCH, and the TPC bits (1 per slot) are used for downlink power control on all the dedicated downlink channels associated with the user (again, not the DSCH).

Explicit signalling of Rate and Antenna Information (RAI) from the wireless unit is preferred as compared to signalling the SIR estimate for reasons cited above in Paragraph 1 of the key aspects. Towards this end a 5-bit Rate and Antenna Information Field is defined. This will comprise of a 4 bit Rate Information (RI) part that allows the wireless unit to select from one of sixteen possible AMC (Adaptive Modulation and Coding) states and a 1-bit antenna indication (AI) field. The role of the AI field can be made dependent on the RI bits. For example, the allowed rates could be partitioned into two disjoint sets, high and low. If the RI field indicates a rate from the high set then the AI field could signal MIMO or non-MIMO reception, whereas if the RI field indicates a rate from the low set, then the AI field could be purely antenna selection. The wireless unit determines the RAI field based on downlink quality estimates, available downlink shared channel power, available downlink orthogonal variable spreading factor (OVSF) code space and predicted neighbor cell loading. A rate ⅓ block code could then be used to map the 5 RAI bits to 15 coded symbols. These 15 coded symbols are carried over three time slots. Such a structure supports the concept of a rate feedback rate of every three slots. Depending on the embodiment, the feedback rate can be slower than the rate of adapting the downlink shared channel in accordance with the rate information.

A single bit ACK/NACK field is defined in support of Incremental Redundancy (IR) and it indicates whether the received packet was in error or not. For example, if X bits are to be transmitted, redundancy is coded into the X bits to produce 3*X bits to be sent. In incremental redundancy, the first X bits are sent, and if a NACK is received, the next X bits are sent. If a NACK is again received, then the final X bits are sent which should be able to be decoded. The rate of ACK/NACK signalling is once per slot i.e. once every 0.667 ms as opposed to the RAI field which is defined over three slots i.e. 3*0.667=2 ms. The ACK bit is repeated five times to form five coded symbols and transmitted over 0.667 ms duration. When the wireless unit does not have a transmission to acknowledge, the ACK/NACK field is ignored by the base station or could be gated OFF. Transmission of 5 RAI bits every 3 slots and 1 ACK/NACK bit per slot results in a total uplink (UL) feedback rate for High Speed Downlink Packet Access (HSDPA) of about 4 kbps. This compares well with an average bit rate of around 6 kbps for 12.2 Kbps Adaptive Multirate (AMR) for voice service with an activity factor of 0.5.

Fast cell site selection will be based on using OVSF code covers for the RAI field. Instead of using the uplink DPCCH channelization code, the cell is identified by a different OVSF code from a limited pre-determined set of OVSF codes of spreading factor 128.

Figure 2:
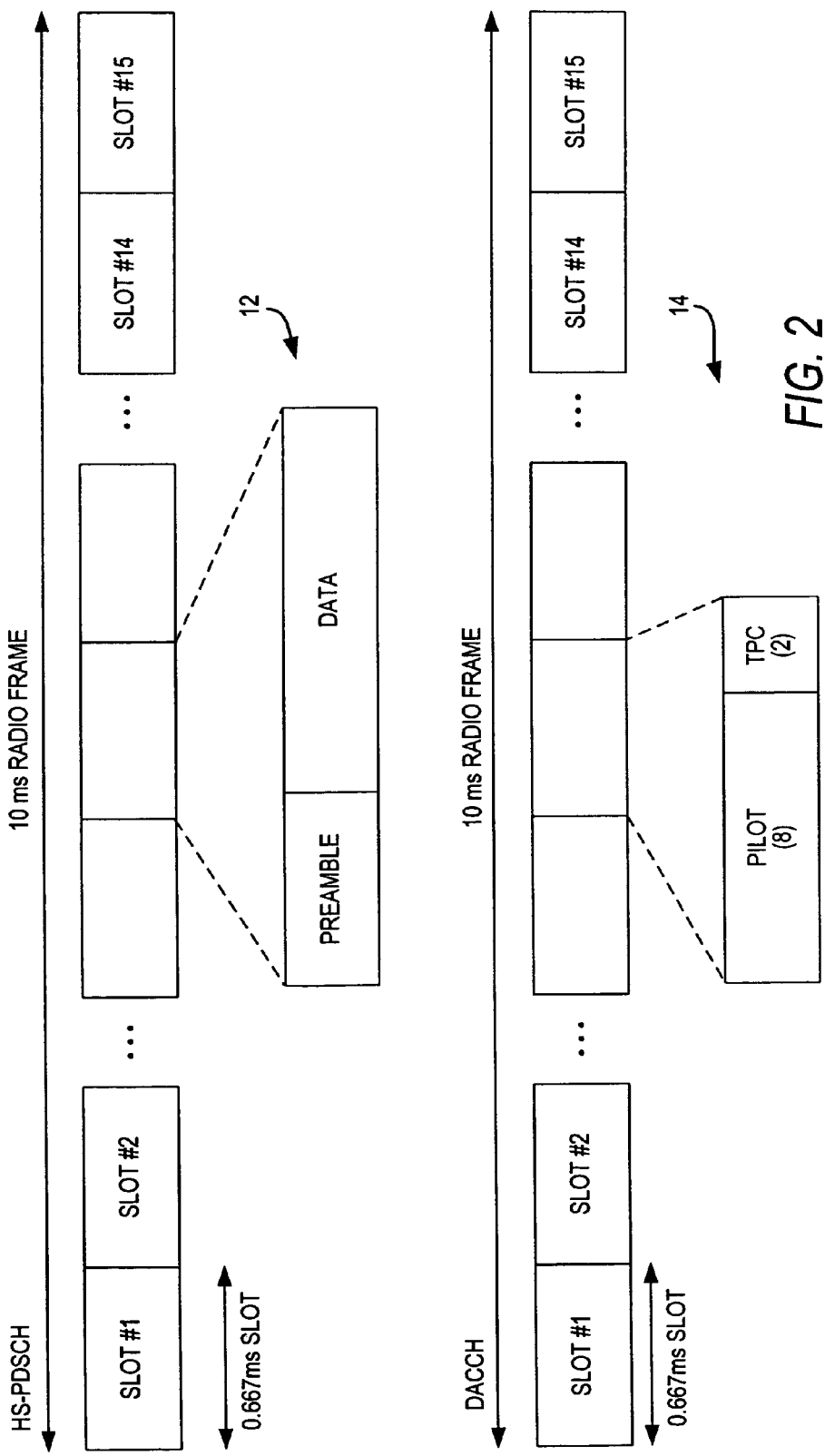
FIG. 2 shows a general diagram of an embodiment of the downlink shared channel (HS-DSCH) and the downlink associated control channel (DACCH) according to principles of the present invention.

FIG. 2 shows the frame structure of an embodiment of the downlink shared channel (HS-DSCH) 12 and the downlink associated control channel (DACCH) 14. It is known that a shorter Transmission Time Interval (TTI) provides certain advantages. Smaller granularity for the downlink shared channel TTI provides the following advantages:

Better base station adaptation of the downlink shared channel due to the formation of smaller size packets. This is essential for the higher rates of the downlink shared channel and leads to higher frame-fill efficiency. Note, internet packet sizes vary from 60 bytes-1500 bytes.

Better adaptation to the channel conditions when combined with efficient and fast scheduling. By using smaller TTI or packet sizes, changes in the channel can be fed back and applied faster on the downlink.

Therefore, it is proposed that the downlink shared channel 12 meet the the following two basic definitions:

The downlink shared channel TTI equals 1 slot interval, TTI=1×Ts. The slot duration is Ts=0.667 ms.

This new TTI is the minimum time interval for which the downlink shared channel resource is allocated to a wireless unit. The actual time for transmission depends on the Incremental Redundancy (IR) performance.

Known systems have a downlink shared channel associated with a Downlink Dedicated Channel (DCH) which maps into a physical dedicated channel (PDCH). The DCH is used to point to the downlink shared channel. The DCH indicates to the wireless unit when it should decode the downlink shared channel (DSCH) and the associated spreading code information. This method does not make the most efficient use of the available channelization code space.

The new DACCH carries the TPC bits that implement uplink power control. In addition, the Pilot bits are time-multiplexed in this channel as well. For each wireless unit, their DACCH are code multiplexed with an OVSF code of spreading factor (SF) 512, resulting in considerable code space saving in the downlink. Furthermore, since this is a dedicated channel, it is power controlled from the TPC bits sent in the UL DPCCH.

The definition of this new channel replaces the dedicated pointer channel (DPTRCH) known in the art. Similarly, new functionality is defined for the DSCH in the next section. The DACCH fields are shown in Table 1.

TABLE 1

DACCH Fields

| Channel | SF | Bits/Slot | Pilot (Bits/Slot) | TPC (Bits/Slot) |
| --- | --- | --- | --- | --- |
| DACCH | 512 | 10 | 8 | 2 |

Table 1. DACCH Fields

The HS-DSCH uses multi-code transmission using the available channelization code space. In this channel, traffic data and a preamble, per TTI, are time multiplexed within the downlink shared channel frame. As described above, a shorter TTI that is equal to 1 slot is proposed. The preamble field duration per TTI is not fixed and is determined by RAI field in the UL DPCCH. The preamble contains fields that declare:

MAC user ID to which the TTI belongs.

Asynchronous Incremental Redundancy (AIR)

The use of preamble within the HS-DSCH TTIs alleviates the use of additional code-multiplexed channels that will have to carry the various control fields. The preamble solution preserves the OVSF code space, and reduces decoding latencies. The preamble is of variable length depending on the UL DPCCH RI field decoding. The wireless unit is then aware of the preamble length.

TABLE 2

| HS-DSCH Fields | |
| --- | --- |
| Preamble (bits) | Data (bits) |
| Variable length dependent on the UL DPCCH RI field decoding. | Variable length dependent on the decoding of the UL DPCCH RI field decoding. |

Table 2: HS-DSCH Fields

A new Beacon Control Channel (BEACCH) is defined. The coexistence of the downlink shared channel (HS-DSCH) with circuit-switched or dedicated downlink channels requires that the downlink power available to the HS-DSCH users, as well as the subset of the channelization code space available for multicode transmission be broadcasted to all HS-DSCH users. This information is updated at the following rates and are also shown in Table 3:

The power fraction (PF) available for the HS-DSCH is updated every TTI (1 slot). This update rate is required in order to follow the power control rate of the voice channels.

The downlink Activity Indicator (DAI) available for HS-DSCH is updated every TTI (1 slot). This field indicates the future (RAI round-trip delay) data activity on the HS-DSCH.

The available OVSF Code Space (OCS) for the HS-DSCH once every 10 ms frame, the rate by which voice users enter or exit the physical layer.

TABLE 3

BEACCH Channel Field Structure

| Channel | SF | Bits/Slot | Power Fraction & DAI (Bits/Slot) | OCS (Bits/Slot) |
| --- | --- | --- | --- | --- |
| BEACCH | 256 | 20 | 14 | 6 |

Table 3: BEACCH Channel Field Structure

In addition to the embodiment(s) described above, the uplink and downlink channel structure has been described for use in a UMTS system where the downlink data channel is a shared, time division multiplexed channel made up of at least one channelization code. The uplink and/or downlink channel structure according to the principles of the present invention can be used with different cellular systems and uplink and/or downlink configurations which omit and/or add components and/or use variations or portions of the described system. For example, the rate information fed back to the base station can include a code sequence which maps to a particular configuration, including coding, modulation and/or antennas, for the base station to adapt the downlink data channel for communication with the wireless unit. Alternatively, the rate information could include a rate or other information the base station can use to calculate a rate or appropriate configuration to communicate over the data channel.

It should be understood that the system and portions thereof and of the described uplink and/or downlink channel structure can be implemented in different locations, such as the wireless unit, the base station, a base station controller and/or mobile switching center. Moreover, logic or hardware required to implement and use the uplink and/or downlink channel structure can be implemented in application specific integrated circuits, software-driven processing circuitry, firmware, programmable logic devices, hardware, discrete components or arrangements of the above components as would be understood by one of ordinary skill in the art with the benefit of this disclosure. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. A method comprising the steps of:

transmitting at a rate on a downlink shared channel having slots with each slot including a preamble locally identifying a wireless unit and data, wherein the downlink shared channel is associated with a dedicated downlink channel;

transmitting on a dedicated control channel, associated with the dedicated downlink channel, information including power control bits that implement uplink power control and pilot bits;

transmitting on a beacon channel a power fraction information, downlink activity information and code space information; and receiving on an uplink dedicated physical control channel, rate information calculated using said power fraction information, said downlink activity information and said code space information for transmitting on said downlink shared channel, and an acknowledgement information indicating the receipt of said data.

2. A method comprising the steps of:

receiving at a rate on a downlink shared channel having slots with each slot including a preamble locally identifying a wireless data unit and data, wherein the download shared channel is associated with a dedicated downlink channel;

receiving on a dedicated control channel associated with the dedicated downlink channel, information including power control bits that implement uplink power control and pilot bits;

receiving on a beacon channel a power fraction information, downlink activity information and code space information; and transmitting at a rate on an uplink dedicated physical control channels, rate information calculated using said power fraction information, said downlink activity information and said code space information and acknowledgment information indicating the receipt of said data.

* * * * *